Patented Jan. 20, 1948

2,434,867

UNITED STATES PATENT OFFICE 2,434,867

BRAZING METAL JOINTS PROTECTED BY SODIUM SILICATE, BY MEANS OF INDUCTION HEATING

Wallace C. Rudd, Larchmont, N. Y., assignor to Induction Heating Corp., New York, N. Y., a corporation of New York No Drawing. Application April 27, 1946, Serial No. 665,635

1 Claim. (Cl. 219—12)

This invention relates to methods for brazing and more particularly to methods adapted for brazing by the use of induction heating.

Induction heating apparatus provides a desirable means for rapidly heating brazing metal and fusing the same for the purpose of forming brazed joints between metal objects. However, in many cases difficulties arise due to the fact that upon fusing the brazing metal at the location of the desired brazen joint, the fused metal will flow away or drop off before the metal parts to be joined are brought up to the necessary high temperature to cause the brazing metal or solder to adhere at the desired areas. For example, if brazed joints are to be made between sections of copper tubing by the use of common forms of silver solder, such solder because of the particular metals alloyed therewith, will have a higher electrical resistivity than the adjacent copper parts. Consequently, when the parts are heated by being subjected to an electromagnetic field, a ring of such solder placed around the desired joint will become heated more rapidly than the copper parts. Thus the silver solder will quickly melt and flow or fall away from the desired position.

The present invention provides a simple method for avoiding this difficulty. The preferred procedure of the invention comprises placing a strip or wire ring of solder, for example, silver solder around the area of the desired joint, the joint area being coated with brazing flux. Then a coating of sodium silicate solution (so-called water glass) is applied. Thereupon the joint area may be heated by electromagnetic induction. Some of the heat which is rapidly generated in the silver solder will be imparted to the surrounding coating of water glass whereby the latter is dried to a sufficient degree to form a firm layer. Accordingly as the solder becomes fused, it will be held in place by this layer until the metal which is to be joined reaches the required temperature for adherence of the solder.

In carrying out the invention for the purpose, for example, of brazing together sections of copper tubing, the desired line of juncture may be surrounded by a ring of silver solder of one of the various types now commercially available. A suitable well known form of brazing flux adapted for use with silver solder, may then be applied. Thereupon a coating of sodium silicate solution is applied, for example in the form of ordinary water-glass, as commercially available, the solution preferably being relatively thick so that it will not readily flow out of place. The joint area will now be ready to be subjected to induction heating which may be accomplished by bringing the same into proximity of a coil carrying high frequency high voltage current of sufficient strength to rapidly heat the metal parts by electromagnetic induction and to the point where the silver solder will be fused for brazing the parts at the joint. However, as the solder is rapidly heated, but before it reaches the temperature of fusion, it will have a substantial drying effect upon the covering of sodium silicate with the consequence that by the time the solder becomes fused, it will be substantially encased and held in place by a firm layer of sodium silicate. Thus the solder will be prevented from flowing or dropping away until the joint parts are also brought up to the necessary temperature for the brazing action to take place.

The use of induction heating for brazing a joint by this procedure is particularly desirable, in that such heating will first cause the solder to be very quickly raised to a temperature such as to more or less solidify the sodium silicate coating starting from the inside surface of such coating, so that almost immediately thereafter as the brazing metal becomes fused, it will be securely held in place by the solidified or partially solidified coating. Thus the heat does not have to pass from the outside through the sodium silicate coating into the solder and the fusing of the solder may be accomplished quickly while the coating is in the process of being brought into a relatively tenacious condition, and with no danger that the coating will be overheated to the point where it might be ineffective for the intended purpose.

While in some instances it has heretofore been proposed to use a brazing flux embodying sodium silicate, I have found that in general if the available and most desirable forms of brazing flux are mixed directly with sodium silicate and applied to the joint, then upon subjecting to induction heating the flux will become of a granular nature and no longer give the proper fluxing effect. On the other hand, if the sodium silicate is applied separately after the brazing metal and flux have been applied to the desired joint, this difficulty will not arise and the sodium silicate as it dries will form a more or less distinct layer, leaving the flux in proper condition to perform its functions while at the same time enclosing the fused solder against flowing away. In the usual case sufficient sodium silicate solution is applied, of such a consistency as to provide a layer of a thickness in the neighborhood of one-sixteenth of an inch.

The term "brazing" as used herein is intended to comprehend the procedure commonly referred to as soldering.

What is claimed as new and desired to be secured by Letters Patent is:

Method for brazing a joint between two metal members which comprises applying brazing metal together with flux along the joint, applying thereover a coating of sodium silicate solution, then subjecting the joint area to a high frequency electromagnetic field of sufficient intensity to cause induction heating of the metals and fusion of the brazing metal and with a consequent drying action on the sodium silicate to form thereof a firm layer which will act to retain the brazing metal in position along the joint upon fusing of the brazing metal by such induction heating.

WALLACE C. RUDD.

REFERENCES CITED

The following references are of record in the file of this patent:

UNITED STATES PATENTS

| Number | Name | Date |
|---|---|---|
| 2,146,393 | Burrell | Feb. 7, 1939 |

OTHER REFERENCES

Bulletin No. 12-A (1943), pages 16 and 17, Handy and Harman, 82 Fulton St., New York, New York.

G. E. Review, Feb. 1944, pages 17 and 18.